UNITED STATES PATENT OFFICE.

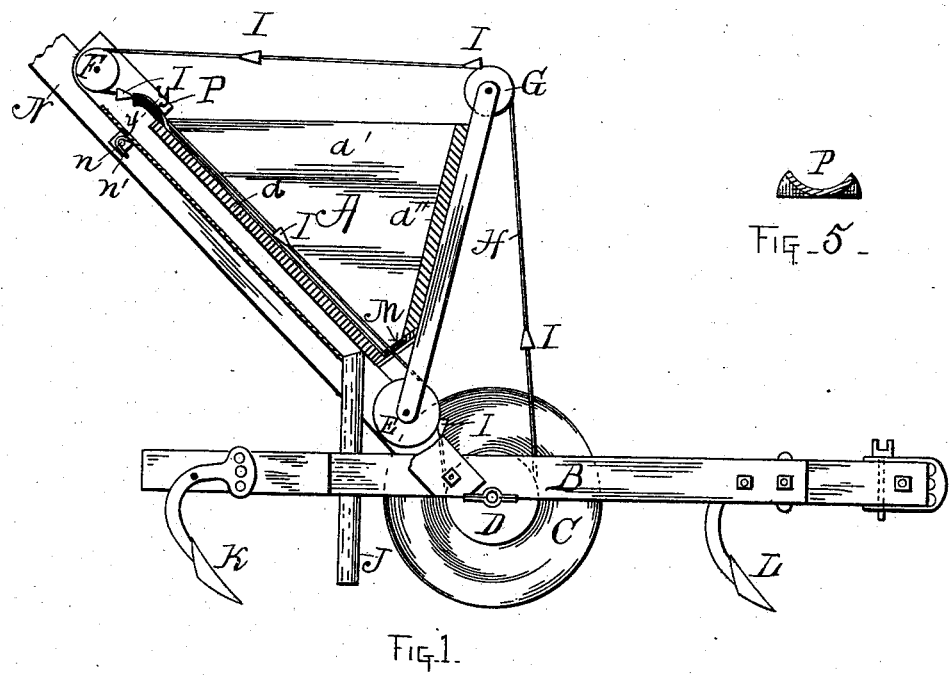

HERMAN THADEN, OF ATLANTA, GEORGIA.

SEED-PLANTER.

SPECIFICATION forming part of Letters Patent No. 389,776, dated September 18, 1888.

Application filed April 20, 1888. Serial No. 271,320. (No model.)

*To all whom it may concern:*

Be it known that I, HERMAN THADEN, a citizen of the United States of America, and a resident of Atlanta, in the county of Fulton and State of Georgia, have invented a new and useful Seed-Planter; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of seed-planters that plant the seeds in hills, the object being to simplify the construction and to make them more certain in their operation and easily adjusted to plant the hills at any desired distance apart or so close together as to amount practically to drilling. It has also been my object to produce a distributing device that might be easily duplicated in the same planter for the purpose of evenly planting a second kind of seeds or distributing fertilizer at the same time.

The invention consists of a hopper for carrying the seeds and means for distributing the same, in combination with opening and covering mechanism, all of which will be hereinafter fully described.

In the accompanying drawings, Figure 1 is a side elevation, partly in section, on the line *x*, Fig. 2, showing all the operative parts. Fig. 2 is a plan showing more clearly the construction of the frame, and further showing the incline up which the seed-buckets travel. Fig. 3 is a somewhat enlarged section of a portion of Fig. 1, more clearly showing a brush to close the opening of the hopper. This figure also shows the preferred manner of supporting the chute and dependent parts. Fig. 4 is a central section through a seed-bucket, and shows the preferred form of attaching the same to the carrying-belt. Fig. 5 is a cross-section on the line *y* of Fig. 1 of the metal strip on which the buckets slide.

In the figures, like reference marks indicating corresponding parts in the several views, A designates the hopper; B, the frame; C, the main driving and carrying wheel, and D a sheave on the driving-wheel.

E, F, and G are sheaves for carrying the belt H, which is preferably a round cord, to which are attached the buckets I.

J is a chute that carries the seed to the furrow, as shown, from the bottom side of the hopper to a point that will discharge the seeds behind the wheel C and ahead of the covering-plows K. The plow L opens the furrow in which the wheel C runs and the seeds are dropped.

M represents bristles in the form of a flat brush that prevent the leakage of seed at the bottom of the hopper and are readily pushed aside for the buckets, as will be hereinafter described.

The frame B may be of any desired form; but I prefer the form shown, the handles N being attached in the usual way. To a rod, *n*, of wood or iron, I suspend the hopper by the hooks *n'* on the side *a*, which side rests against the handles, said hopper being held firmly in this position by the tension of the belt H, running from the sheaves D on the driving-wheel and over the sheaves E, F, and G, that are journaled on brackets carried by the hopper, the tension of the belt tending to hold the hopper firmly in position. The side *a* of the hopper should be of such a width and form as will cause it to reach over the outer sides of the handles; but the sides *a'* and *a''* are of truncated triangular form and leave a small opening at the bottom that is closed by the bristles M.

The buckets I should have a conical external form, (best shown in Fig. 4,) the opening for the seeds being in the larger end. These buckets are attached to the belt as close together as is necessary to drop the seeds the required distance apart, the preferred means of attachment being shown in Fig. 4—namely, by a wedge, *m*, driven in by the side of the belt against a tapering side of the aperture through the bucket. By this means of fastening, the buckets in any number may be put on and they may be placed at any distance apart on the belt that may be required and be conveniently readjusted whenever necessary.

The sheave D, being attached to the driving-wheel, will, on the planter moving forward, carry the belt and buckets upwardly through the hopper and the seeds that it may contain, with the cup-shaped ends of the buckets ahead, the buckets passing readily through the bristles M, which will close behind them and prevent the accidental discharge of seeds. The buckets in going up through the hopper are in contact with the side *a*, which, to furnish a smoother and more durable surface, is lined with a strip of metal, P, that extends somewhat above the top of the hopper and terminates in a downward bend, being in this projecting part concaved to about the radius of the outside of the buckets, as shown in Fig. 5, to prevent the buckets slipping off sidewise or discharging their contents back into the hopper as they are being tilted by the deflection of the belt at that point. It is obvious that these buckets passing upwardly on the inside and downwardly on the outside of the hopper will carry a uniform quantity of seeds up at regular intervals and discharge them into the chute, by which they will be carried and discharged into the furrow. It is also obvious that a double hopper may be used, such being in all essential particulars like the one shown, and having the same seed-discharging mechanism and driven by two wheels, one being on each side. By this means two kinds of seeds may be planted in the same furrow, or one kind of seed may be planted and fertilizer be discharged at the same time.

Having thus described my invention, what I claim as new, and desire to secure by Letters Patent of the United States, is—

In a seed-planter, the seed-carrying cups I, carried by the belt H, running over the pulleys D, E, F, and G, and driven by the traction-wheel C, in combination with the hopper A, having the bristles M at the entrance-hole for the cups, and also having its lower side, on which the cups run, lined with a concave strip of metal, P, bent downward at the upper end to form a channel to guide said cups and cause the same to discharge into the trough below the hopper for receiving the seed and the spout for delivering it, substantially as set forth.

In testimony whereof I hereunto affix my signature in presence of two witnesses.

HERMAN THADEN.

Witnesses:
A. P. WOOD,
N. P. WOOD.